United States Patent
Muller et al.

[11] Patent Number: 5,842,769
[45] Date of Patent: Dec. 1, 1998

[54] AUTOMOTIVE APPARATUS AND METHOD USING BULB SOCKET RETENTION OF COMPONENTS

[75] Inventors: Robert D. Muller, Royal Oak; Robert M. Schmidt, Livonia, both of Mich.

[73] Assignee: UT Automotive Dearborn, Inc., Dearborn, Mich.

[21] Appl. No.: 992,741

[22] Filed: Dec. 18, 1992

[51] Int. Cl.⁶ .................................................. B60Q 1/00
[52] U.S. Cl. ........................ 362/61; 362/226; 362/83.3; 362/382; 362/23; 362/26
[58] Field of Search ................................. 362/226, 83.3, 362/382, 61, 23, 382.23, 26; 439/546, 547, 548

[56] References Cited

U.S. PATENT DOCUMENTS

| | | | |
|---|---|---|---|
| 3,511,982 | 5/1970 | Salter | 362/226 |
| 4,076,358 | 2/1978 | Taormina et al. | |
| 4,516,824 | 5/1985 | Winogrocki et al. | 439/547 |
| 4,547,840 | 10/1985 | Tinder | |
| 4,682,274 | 7/1987 | Freudenreich et al. | 362/61 |
| 4,893,218 | 1/1990 | Dilk et al. | 362/61 |
| 4,926,301 | 5/1990 | Liverance et al. | 362/226 |
| 5,226,723 | 7/1993 | Chen | 362/800 |

OTHER PUBLICATIONS

Promotional Brochure by JKL Components Corporation, Copyright 1984, "Introducing JKL Neo–Wedge. The New Sub–Miniature Lamp System That Mounts directly to PC Boards, Improves Reliability and Saves Space,", pp. 2–3.

*Primary Examiner*—Ira S. Lazarus
*Assistant Examiner*—David Lee
*Attorney, Agent, or Firm*—Harness, Dickey & Pierce, P.L.C.

[57] ABSTRACT

In accordance with the present invention, an automotive device is comprised of a substrate, a second component, and a light bulb socket, whereby the bulb socket retains the second component, directly or indirectly, to the substrate; the second component is solely attached to the substrate, directly or indirectly, by the bulb socket. More specifically, the substrate is an outer housing and the second component is a lamp reflector. The present invention also comprises the method of inserting and retaining these parts with the bulb socket. Furthermore, the present invention may be part of a backlit switch, an overhead reading lamp, or an instrument panel light.

27 Claims, 2 Drawing Sheets

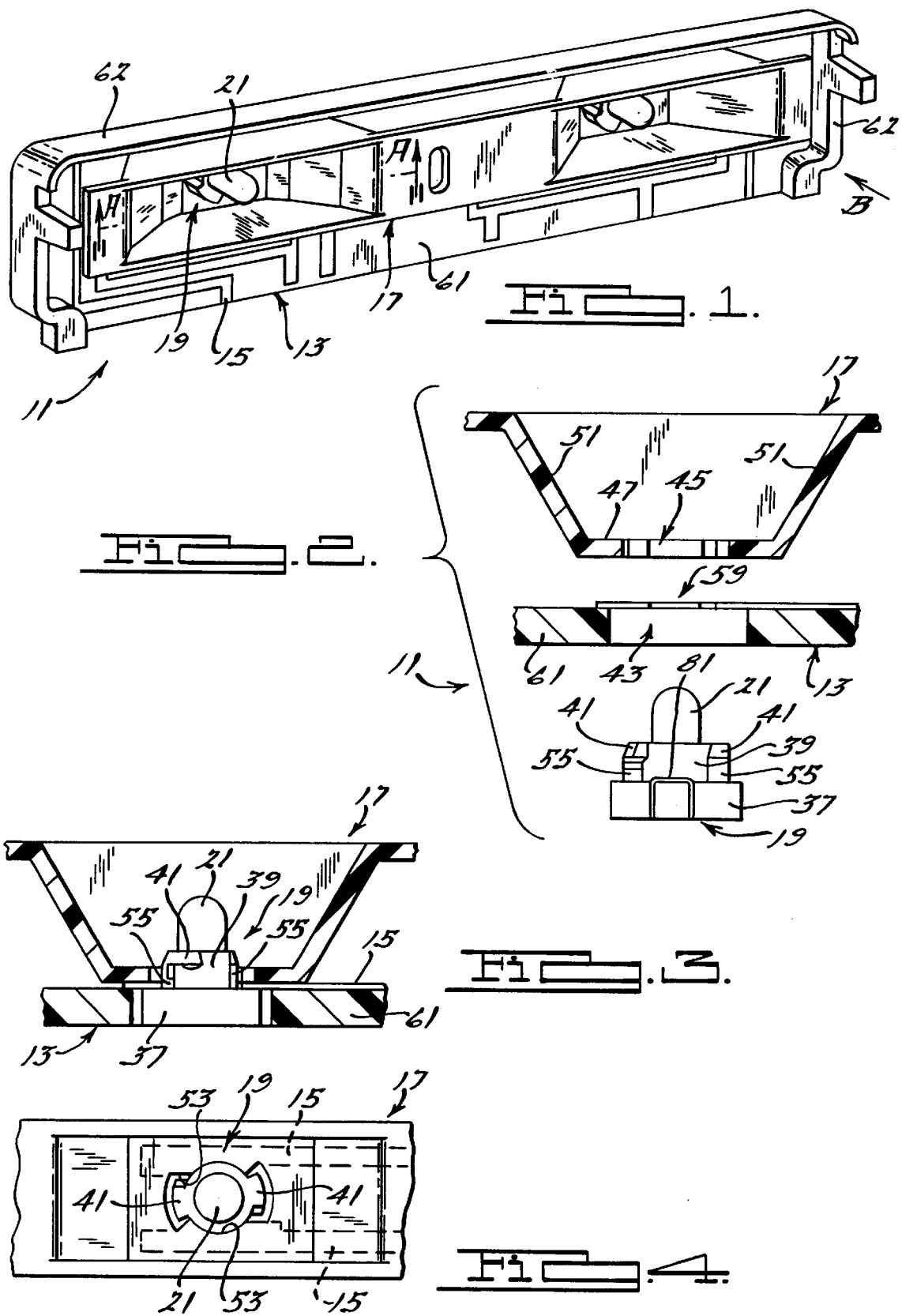

AUTOMOTIVE APPARATUS AND METHOD USING BULB SOCKET RETENTION OF COMPONENTS

BACKGROUND OF THE INVENTION

This invention relates generally to an apparatus and method for retaining lamp components with a bulb socket and specifically to an automotive backlit switch using a bulb socket to retain a lamp reflector.

The current automotive market has become increasingly cost competitive and quality conscious. In turn, automotive components such as lamps and switches are being designed to reduce assembly steps by allowing the parts to serve many functions. Traditionally, a switch has an outer housing, an electrical circuit, a mechanical switching button with corresponding electrical contacts, and an outer appearance bezel. On occasion, a printed circuit board may take the place of both the housing and electrical circuit. Many of these switches are backlit thereby providing better identification at night. These backlit switches usually have a light bulb, a bulb socket, a lamp reflector to gather and direct the light from the bulb, and an appearance lens which may take the form of written words. Commonly, a conductive stamping or circuit board supplies current to the bulb socket, and in turn, the light bulb; the stamping or circuit board is often heat staked to the outer housing. Moreover, the lamp reflector is merely held in place between the outer bezel and the outer housing with no true attachment; this can cause a poor fit and rattling noises. The bulb socket is retained by twisting it onto the housing, the electric circuit stamping, or the circuit board, located thereupon.

SUMMARY OF THE INVENTION

In accordance with the present invention, an automotive device is comprised of a substrate, a second component, and a light bulb socket; the bulb socket acts to solely retain the second component, either directly or indirectly, to the substrate. More specifically, the substrate is an outer housing and the second component is a lamp reflector. The present invention also comprises the method of inserting and retaining these parts with the bulb socket. Furthermore, the present invention may be part of a backlit switch, an overhead reading lamp, or an instrument panel light.

An advantage of the present invention is that the bulb socket not only serves to hold the light bulb, and to conduct electricity from the electrical circuit to the light bulb, but it also serves to retain the lamp reflector. This invention is very cost effective compared to the traditional approach since assembly steps are reduced and the parts serve multiple functions. Furthermore, undesirable rattles are also reduced due to the tight fit of the components to each other.

BRIEF DESCRIPTION OF THE DRAWINGS

FIG. 1 is a perspective view showing an automotive backlit switch of the present invention;

FIG. 2 is an exploded sectional side view showing the embodiment of the present invention from FIG. 1 taken at section A;

FIG. 3 is a sectional side view showing the embodiment of the present invention taken from FIG. 1 at section A;

FIG. 4 is a true view, in the direction of arrow B, showing the embodiment of the present invention prior to installation, taken from FIG. 1;

DESCRIPTION OF THE PREFERRED EMBODIMENT

Figure 5:
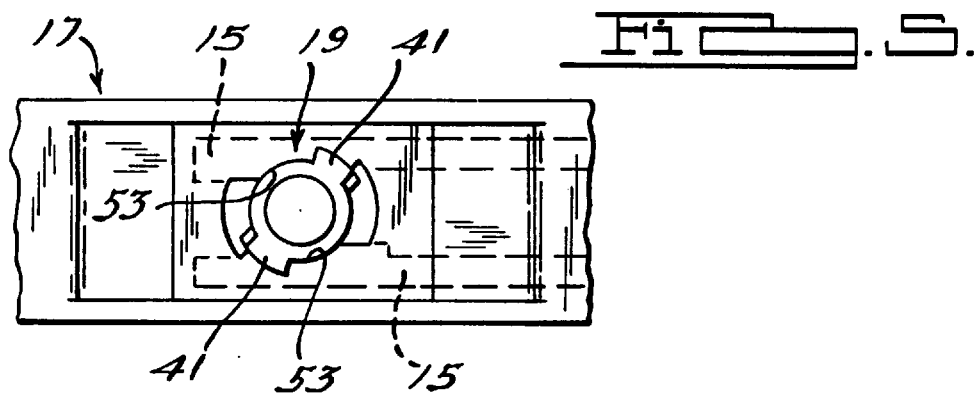
FIG. 5 is a true view, in the direction of arrow B, showing the embodiment of the present invention when installed, also taken from FIG. 1.

Referring to FIGS. 1 and 2, a backlit switch 11 of the present invention is shown. The backlit switch 11 has a substrate 13, an electric current conducting means 15, a switching means 23, a second component such as a lamp reflector 17, a bulb socket 19 and a light bulb 21. In the preferred embodiment of this invention, the light bulb socket 19 serves to fasten the lamp reflector 17 to the electric current conducting means 15 which has been pre-attached to the substrate 13.

The substrate 13 preferably acts as an outer housing for the switch. In this embodiment, the substrate 13 has a generally flat center portion 61 bordered by upwardly extending side walls 62 around the perimeter thereof. The substrate 13 has a hole 43 molded therewithin. The substrate 13 is preferably injection molded from Minlon, which is a glass filled Nylon, and can be obtained E. I. du Pont de Nemours & Co.

Figure 6:
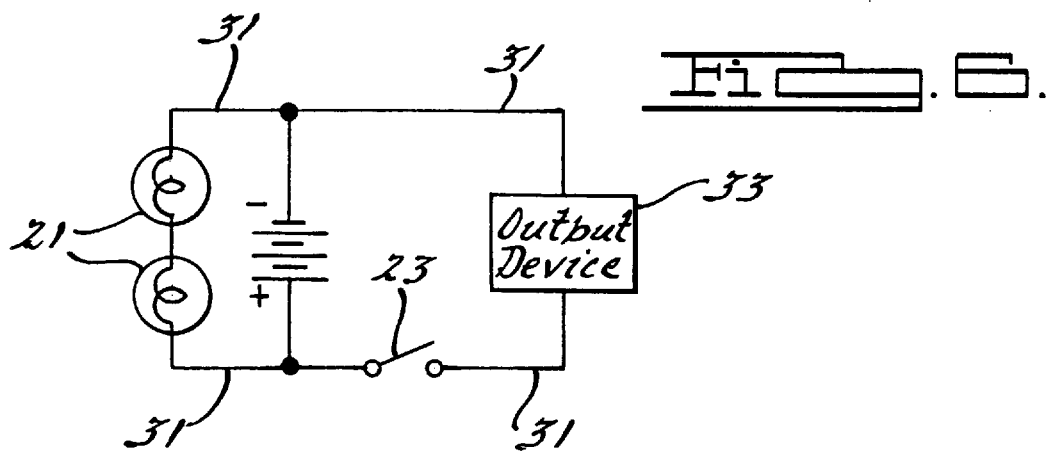
FIG. 6 is a schematic diagram showing the embodiment of the present invention from FIG. 1.

The electric current conducting means 15 is located on top of or within the center portion 61 of the substrate 13. The electric current conducting means 15 is preferably made from a copper stamping, such as copper 110 half hard, and it is insert molded within the substrate 13. The electric current conducting means 15 has an elongated opening 59 cut therewithin. As can best be seen in the schematic diagram, FIG. 6, power is supplied to the electric current conducting means 15 through an accessory lead 31. The accessory lead 31 supplies electrical current to a bulb socket 19 connected thereto. A light bulb 21 is placed into and electrically connected with the bulb socket 19. The light bulb 21 is preferably a T1 wedge base bulb. Another accessory lead 31, connected through a switching means 23, provides current to an output device 33, such as a trunk release mechanism or a fuel filler door release mechanism. The bulb socket 19 is always connected to both the positive and negative accessory leads 31 when the automotive vehicle head lamps are turned on.

Referring to FIGS. 1 through 3, a second component, in the preferred embodiment, a lamp reflector 17, is positioned on top of the electric current conducting means 15 and, in turn, on top of the substrate 13. The lamp reflector 17 has a substantially flat center portion 47 surrounded by angled walls 51 extending upward therefrom. An elongated slot or aperture 45 is positioned within the center portion 47 of the lamp reflector 17. The lamp reflector slot 45 is generally hourglass shaped with a circular cutout being centrally located therewithin. Flat portions border the length 53 of the lamp reflector slot 45. The lamp reflector 17 is preferably injection molded from Lexan 141 Polycarbonate, which can be obtained from General Electric Plastics. An aesthetically pleasing lens will cover the top of the lamp reflector 17.

The bulb socket 19 serves to physically retain and conduct electricity to the light bulb 21. The bulb socket 19 is preferably a T1 wedge base bulb socket and can be obtained from Harrison Electric Co., Ltd. The bulb socket 19 has a circular shaped base 37, the backside of which is substantially flat with a screw driver slot centrally located thereupon. The top of the base contains electrical contact means 81 for supplying power from the electric current conducting means 15 to the bulb 21. Extending upward from the socket base 37 is a center cylindrical portion 39 which is circular in cross sectional shape but having a diameter smaller than the socket base 37. Toward the top of the bulb socket 19 is an attachment portion which is preferably an hourglass shaped winged portion 41 being centered about and extending oppositely outward from the socket center portion 39. A rib 55 extends outward from the center portion 39 and connects the trailing edge of the socket winged portion 41 to the socket base 37.

As can be observed in FIGS. 2–5, the socket winged portion 41 and center portion 39 are inserted up through the hole 43 in the substrate 13, through the opening 59 in the electric current conducting means 15, and through the lamp reflector slot 45. The bulb socket 19 is rotated about its axial centerline such that the bottom of each winged portion 41 overlaps the flat portions along length 53 of the reflector slot 45. The socket base 37 has a diametral size greater than the current conducting means opening 59. Therefore, the bulb socket 19 effectively traps and retains the lamp reflector 17 against the electric current conducting means 15 which has been previously attached to the substrate 13. No other attachment is needed for the lamp reflector 17 such that it is an otherwise independent part. The top sides of the substrate 13 and lamp reflector 17 are usually covered by an aesthetically pleasing bezel.

Figure 7:
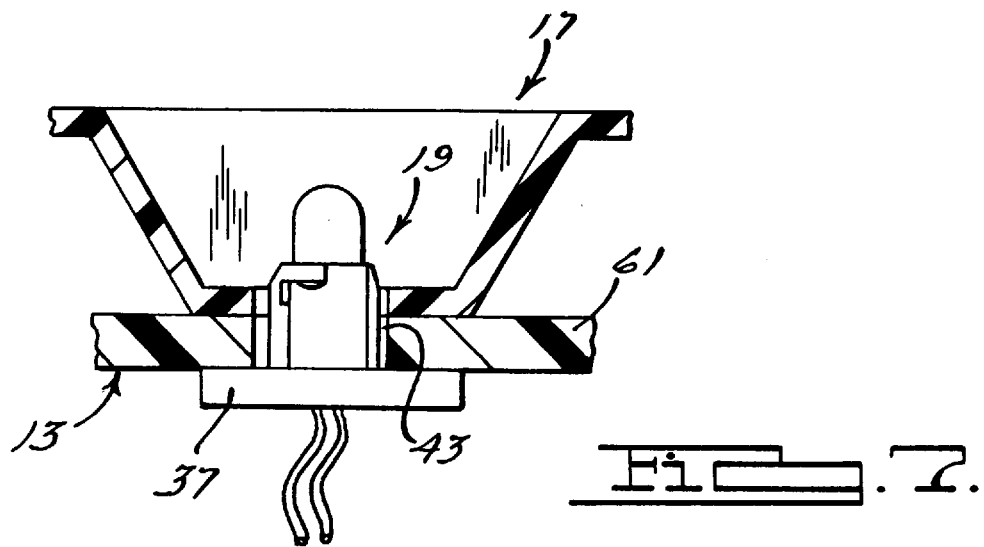
FIG. 7 is a view similar to that of FIG. 3 showing an alternate embodiment of the present invention from FIG. 1.

As an alternate embodiment of the present invention, the bulb socket 19 can retain the lamp reflector 17 directly upon the substrate 13. This can best be seen in FIG. 7. The diametral size of a the socket base 37 must therefore be larger than the substrate hole 43. The bulb socket 19 would be electrically powered by discrete wires extending rearwardly therefrom, thus, a conductive stamping 15 would not be required between the reflector 17 and the substrate 13.

It will be appreciated that the bulb socket retention of the present invention represents a significant cost savings and quality improvement. Since the bulb socket not only holds and powers a light bulb, but retains the lamp reflector to the electric current conducting means, which has been pre-attached to the substrate, assembly steps can be minimized. Furthermore, the method by which the bulb socket is installed within the invention to retain the lamp reflector to the electric conducting means improves the final product's quality.

While a number of specific embodiments of this switch and the method to assemble this switch have been disclosed, it will be appreciated that various modifications may be made without departing from the present invention. For example, a bulb socket may be used to retain an appearance bezel to the electric conducting means. Also, while insert molded copper stampings have been described as a means to conduct electrical current to the bulb socket, a printed circuit board could also be used without departing from the present invention. While various materials and bulb types have been disclosed in exemplary fashion, various other materials and light bulbs may of course be employed. It is intended by the following claims to cover these and any other departures from these disclosed embodiments which fall within the true spirit of this invention.

The invention claimed is:

1. An apparatus with a lamp, for an automotive vehicle, comprising:

a substrate having a hole therein, a lamp reflector positioned in close proximity to said substrate, said lamp reflector being an independent part from said substrate, said lamp reflector having a substantially flat portion thereupon with an aperture therein aligned with said substrate's hole;

a bulb socket having a base, a center portion, and an attachment portion, said center portion extending upward from said base, said center portion having a smaller cross sectional shape than that of said base, said attachment portion being centered about and extending outward from opposing sides of said center portion, said center portion being of a smaller cross sectional shape than the hole in said substrate, said attachment portion being at least partially insertable through said hole in said substrate; and said attachment portion and said center portion of said bulb socket being aligned with the hole in said substrate and said aperture in said lamp reflector, said attachment portion and said center portion extending up through the hole of said substrate and said aperture of said lamp reflector, said attachment portion at least partially overlapping said flat portion adjacent to said aperture, whereby said lamp reflector is retained to said substrate by said bulb socket.

2. The apparatus of claim 1 wherein: said lamp reflector has said flat portion centrally therein, said lamp reflector has generally angled walls extending outwards therefrom, a light bulb is centrally located therewithin.

3. The apparatus of claim 2 wherein: said lamp reflector is a polymeric material.

4. The apparatus of claim 1 wherein: said substrate is a printed circuit board.

5. The apparatus of claim 1 wherein:

said bulb socket retains a light bulb and supplies electrical current to said light bulb.

6. The apparatus of claim 1 wherein said bulb socket attachment portion includes:

a winged portion being longer in a first direction than in a second direction perpendicular thereto, said winged portion and said center portion being of a smaller cross sectional shape than the hole in said substrate, said winged portion and said center portion proximate therewith being of a shape similar to but smaller than said aperture in said lamp reflector and being at least partially insertable through said hole in said substrate, said bulb socket being attachable to said lamp reflector by rotating said winged portion relative to said aperture in said lamp reflector.

7. The apparatus of claim 1 wherein:

said bulb socket base is larger than said hole in said substrate, whereby said bulb socket sandwiches and retain said substrate and said lamp reflector between said bulb socket attachment portion and said bulb socket base.

8. The apparatus of claim 1 further comprising: an electric current conducting means being located between said lamp reflector and said substrate, said electric current conducting means being substantially flat and having an opening therewithin, the center of said electric current conducting means opening being substantially aligned with said lamp reflector's slot and said substrate's hole.

9. The apparatus of claim 8 wherein:

said bulb socket base is smaller than said hole in said substrate, whereby said bulb socket retains said lamp reflector to said electric current conducting means.

10. An apparatus with a lamp, for an automotive vehicle, comprising:

a substrate having a substantially flat portion with a hole therein, an electric current conducting means being located against said substrate, said electric current conducting means being substantially flat, said current conducting means having an opening therewithin, the center of said electric current conducting means opening being substantially aligned with said substrate's hole, a lamp reflector, positioned on top of said electric current conducting means, said lamp reflector being an independent part from said substrate, said lamp reflector having a substantially flat portion thereupon and an elongated slot therein, said lamp reflector's slot being longer in a first direction than in a second direction perpendicular thereto, the center of said lamp reflector's slot being aligned with said substrate's hole, a bulb socket, for retaining and supplying current to a light bulb, said bulb socket having a base, a center portion, and a winged portion, said base being substantially circular, said center portion cylindrically extending upward from said base, said center portion having a circular cross sectional shape with a diameter smaller than that of said base, said winged portion being centered about and extending outward from opposing sides of said center portion, said winged portion being longer in a first direction than in a second direction perpendicular thereto, said winged portion, said center portion, and said base being of a shape smaller than the hole in said substrate, said winged portion and said center portion being of a shape similar to but smaller than the opening of said electric current conducting means and the slot in said second component; and said winged portion and said center portion of said bulb socket being aligned with the hole in said substrate, the opening in said electric current conducting means and the slot in said lamp reflector, said winged portion and said center portion extending up through the hole of said substrate, the opening in said electric current conducting means and the slot of said lamp reflector, said bulb socket being in a rotated position such that said winged portion overlaps said the flat portion along the length of said lamp reflector's slot, said bulb socket base being of a larger diameter than the opening in said electric current conducting means whereby said bulb socket sandwiches and retains said electric current conducting means and said lamp reflector between said bulb socket winged portion and said bulb socket base.

11. The apparatus of claim 10 wherein: said lamp reflector has a central flat portion therein, said lamp reflector has generally angled walls extending outwards therefrom, said light bulb is centrally located therewithin.

12. The apparatus of claim 10 wherein: said lamp reflector is comprised of a polymeric material.

13. The apparatus of claim 10 wherein: said electric current conducting means is a copper stamping.

14. The apparatus of claim 10 wherein: said substrate is a printed circuit board.

15. The apparatus of claim 10 wherein: said electric current conducting means is comprised of conductive ink printed on thin film.

16. The apparatus of claim 10 wherein: said electric current conducting means is a printed circuit on said substrate.

17. An apparatus for a back lit switch, for an automotive vehicle, comprising:

an electrical switch, a substrate having a substantially flat portion with a hole therein, an electric current conductor being located against said substrate, said electric current conductor being substantially flat with an opening therewithin, the center of said opening being substantially aligned with said substrate hole, said electric current conductor being electrically coupled with said electrical switch, a lamp reflector, positioned on top of said electric current conducting means, said lamp reflector being an independent part from said substrate, said lamp reflector having a substantially flat portion thereupon, and an elongated slot therein, said second lamp reflector's being longer in a first direction than in a second direction perpendicular thereto, the center of said lamp reflector's slot being aligned with said substrate's hole, a bulb socket, for retaining and supplying current to a light bulb, said bulb socket having a base, a center portion, and a winged portion, said base being substantially circular, said center portion cylindrically extending upward from said base, said center portion having a circular cross sectional shape with a diameter smaller than that of said base, said winged portion being centered about and extending outward from opposing sides of said center portion, said winged portion being longer in a first direction than in a second direction perpendicular thereto, said winged portion, said center portion, and said base being of a shape smaller than the hole in said substrate, said winged portion and said center portion being of a shape similar to but smaller than the opening of said electric current conducting means and the slot in said second component; and said winged portion and said center portion of said bulb socket being aligned with the hole in said substrate, the opening in said electric current conducting means and the slot in said lamp reflector, said winged portion and said center portion extending up through the hole of said substrate, the opening in said electric current conducting means and the slot of said lamp reflector, said bulb socket being in a rotated position such that said winged portion overlaps said the flat portion along the length of said lamp reflector's slot, said bulb socket base being of a larger diameter than the opening in said electric current conducting means, whereby said bulb socket sandwiches and retains said electric current conducting means and said lamp reflector between said bulb socket winged portion and said bulb socket base.

18. The apparatus of claim 17 is a deck lid release switch.

19. The apparatus of claim 17 is a fuel filler door release switch.

20. A method for retaining components within an automotive vehicle apparatus comprising:

(a) positioning a lamp reflector upon a substrate such that an aperture in said lamp reflector is substantially aligned to a hole within said substrate, (b) inserting a bulb socket partially up through the hole of said substrate and said aperture in said lamp reflector, said bulb socket having a base, a center portion, and a winged portion, said center portion and said winged portion being inserted at least partially through said hole in said substrate and said aperture in said lamp reflector, (c) rotating said bulb socket about its axial centerline, said winged portion and said base thereby retaining said lamp reflector and said substrate therebetween.

21. The method of claim 20 wherein:

said substrate has a substantially flat portion with a hole therein, said lamp reflector is positioned in close proximity to said substrate, said lamp reflector is an independent part from said substrate, said lamp reflector has a substantially flat portion with said aperture including an elongated slot therewithin, said lamp reflector's slot is longer in a first direction than in a second direction perpendicular thereto; and said bulb socket retains and supplies current to a light bulb, said bulb socket base is substantially circular with a generally flat bottom, said center portion cylindrically extends upward from said base, said center portion has a circular cross sectional shape with a diameter smaller than that of said base, said winged portion is centered about and extends outward from opposing sides of said center portion, said winged portion is longer in a first direction than in a second direction perpendicular thereto, said winged portion and said center portion are of a shape smaller than the hole in said substrate, said winged portion and said center portion are of a shape similar to but smaller than the slot in said second component.

22. A method for retaining components within an automotive vehicle backlit switch comprising:

(a) affixing an electric current conductor upon a substrate, said electric current conductor having an elongated opening contained therein, said opening being substantially aligned to a hole within a substrate, (b) positioning a lamp reflector upon said electric current conductor such that an elongated slot in said lamp reflector is substantially aligned to said opening in said electric current conductor, (c) inserting a bulb socket at least partially through said hole of said substrate, said opening of said electric current conducting means, and said elongated slot of said second component, said bulb socket having a base, a center portion, and a winged portion, (d) rotating said bulb socket about its axial centerline, whereby said winged portion and said base portion retain said lamp reflector and said electric current conductor therebetween, a switch actuable to supply electricity through said electric current conductor to illuminate a bulb retained by said bulb socket.

23. The method of claim 22 wherein:

said substrate has a substantially flat portion with a hole therein, said electric current conductor is located against said substrate, said electric current conductor is substantially flat with an opening wherein said opening is substantially aligned with said substrate's hole, said lamp reflector is positioned on top of said electric current conductor, said lamp reflector is an independent part from said substrate, said lamp reflector has a substantially flat portion thereupon with an elongated slot therein, said lamp reflector's slot is longer in a first direction than in a second direction perpendicular thereto, the center of said lamp reflector's slot is aligned with said substrate's hole, said bulb socket retains and supplies current to a light bulb, said bulb socket has a base, a center portion, and a winged portion, said base is substantially circular, said center portion cylindrically extends upward from said base, said center portion has a circular cross sectional shape with a diameter smaller than that of said base, said winged portion is centered about and extends outward from opposing sides of said center portion, said winged portion is longer in a first direction than in a second direction perpendicular thereto, said winged portion, said center portion, and said base are of a shape smaller than the hole in said substrate, said winged portion and said center portion are of a shape similar to but smaller than the opening of said electric current conductor and the slot in said lamp reflector.

24. The method of claim 23 wherein: said lamp reflector has a central flat portion therein, said lamp reflector has generally angled walls extending outwards therefrom, said light bulb is centrally located therewithin.

25. An apparatus for an automotive vehicle comprising:

a substrate having a hole therein;

an electric current conductor located against said substrate, said electric current conductor having an opening therewithin, said opening of said electric current conductor substantially aligned with said hole in said substrate;

a lamp reflector located substantially against said electric current conductor on a surface thereof opposite from said substrate, said lamp reflector having an orifice therethrough, said orifice of said lamp reflector being substantially coaxial with said opening of said electric current conductor and said hole of said substrate; and a bulb socket having an enlarged portion and an attachment portion thereof, said enlarged portion being sized larger than said opening of said electric current conductor, said attachment portion being at least partially insertable through said orifice of said lamp reflector, said enlarged portion and said attachment portion of said bulb socket retaining said lamp reflector substantially against said electric current conductor.

26. An apparatus for an automotive vehicle comprising:

a substrate having a hole therein;

an electric current conductor being located against said substrate;

a lamp reflector positioned in close proximity to said substrate, said lamp reflector being an independent part from said substrate, said lamp reflector having a substantially flat portion thereupon with an aperture therein aligned with said hole in said substrate;

a bulb socket having a base, a center portion, and a winged portion, said base being substantially circular, said center portion cylindrically extending upward from said base, said center portion having a circular cross sectional shape with a diameter smaller than that of said base, said winged portion being centered about and extending outward from opposing sides of said center portion, said center portion being of a smaller cross sectional shape than the hole in said substrate, said winged portion being at least partially insertable through said hole of said substrate; and said winged portion and said center portion of said bulb socket being substantially aligned with the hole in said substrate and a slot in said lamp reflector, said winged portion and said center portion extending up through the hole of said substrate and the slot of said lamp reflector, said bulb socket being rotatable such that said wings overlap said flat portion along the length of said slot, said bulb socket base being larger than the hole in said substrate, whereby said bulb socket sandwiches and retains said substrate and said electric current conductor between said bulb socket winged portion and said bulb socket base.

27. An apparatus for an automotive vehicle comprising:

a substrate having a hole therein;

an electric current conductor being located against said substrate, said electric current conductor having an opening therewithin substantially aligned with said hole in said substrate;

a lamp reflector positioned substantially against said electric current conductor, said lamp reflector having a substantially flat portion thereupon with an elongated slot therein, said slot being longer in a first direction than in a second direction perpendicular thereto, said slot being substantially aligned with said hole in said substrate, said lamp reflector being an independent part from said substrate;

a bulb socket having a base, a center portion, and a winged portion, said center portion extending upward from said base, said center portion having a cross sectional shape smaller than that of said base, said winged portion being centered about and extending outward from opposing sides of said center portion, said winged portion, said center portion, and said base being substantially smaller in cross sectional shape than the hole in said substrate; and said winged portion and said center portion being at least partially insertable through the hole of said substrate, the opening in said electric current conductor and the slot of said lamp reflector, said bulb socket being rotatable such that said winged portion substantially overlaps said the flat portion along the length of said lamp reflector's slot, said bulb socket base being larger than the opening in said electric current conductor whereby said bulb socket sandwiches and retains said electric current conductor and said lamp reflector substantially between said bulb socket winged portion and said bulb socket base.

* * * * *